March 20, 1956 J. MUIRHEAD 2,739,000

COUPLING PIN RETAINING CLIP

Filed Aug. 22, 1952

INVENTOR
JAMES MUIRHEAD

BY F. P. Keiper

ATTORNEY 2,739,000

COUPLING PIN RETAINING CLIP

James Muirhead, Syracuse, N. Y., assignor, by mesne assignments, to The Murray Corporation of America, Detroit, Mich., a corporation of Delaware Application August 22, 1952, Serial No. 305,828

1 Claim. (Cl. 287—108)

This invention relates to a coupling pin retaining clip.

The present invention is directed to a clip adapted to be resiliently clamped upon the ends of a transverse pin utilized in coupling a shaft and sleeve together in telescopic relation, the clip preventing the pin from displacement in the event that looseness should develop as a result of vibration or other causes. In washing machines of the type having centrifugal extractors, a poorly balanced load may result in vibration, resulting in wear at the control shaft coupling, and the invention has been particularly applied to a coupling pin utilized in the manual control lever of such machines.

More particularly, the invention relates to a resilient C-clamp formed of thin strip metal, in which the open ends of the C are recessed oppositely and adapted to be sprung apart to receive the ends of a transverse pin so as to prevent the pin, even though loose in the coupled members, from dropping out.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

In the drawings, wherein like reference characters indicate like parts:

Figure 1:
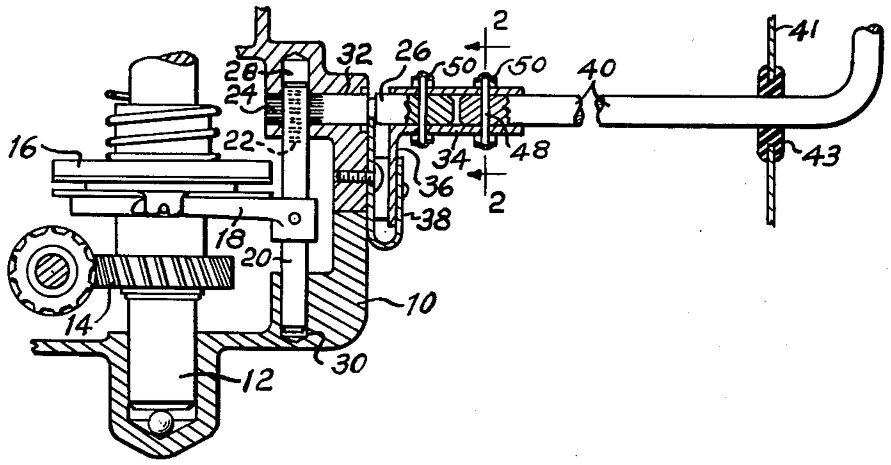
Figure 1 is a sectional view of a manual control for the extractor drive of a washing machine, showing the type of pin coupling with the clamp attached.

In the drawings, there is shown a washing machine transmission casing 10 having a vertical centrifugal extractor shaft 12 on which there is positioned a helical driven pinion 14, such pinion being adapted to be coupled to the shaft 12 through a clutch 16. Actuation of the clutch is had through vertical movement of a yoke 18 mounted on a sliding bar 20, such bar having rack teeth 22 engaging integral teeth 24 in a transverse control shaft 26. The bar 20 slides vertically in bores 28 and 30 in the casing 10, and the shaft 26 is journaled in a casing bore extending transversely of the bores 28 and 30, such bore being indicated at 32. The control shaft 26 has affixed to the end thereof a coupling sleeve 34, such sleeve having an integral wing 36 riding in a friction detent mechanism 38. The coupling sleeve is joined to a control lever and shaft 40, the ends of shafts 26 and 40 being telescoped within the sleeve 34 in substantial abutting relation. The control shaft 40 may pass through a panel structure 41, a grommet 43 being provided for support.

In order to join the shafts 26 and 40 with the coupling sleeve 34, the shafts are each provided with a diametral bore 42 adjacent their ends, adapted to be aligned with diametral bores 44 and 46 in the opposite sides of the sleeve 34. Extending through and positioned in such bores is a snug-fitting, preferably hardened pin 48, two being utilized in the arrangement shown. The structure described is similar to that shown in an application Serial No. 792,363, filed December 18, 1947, now Patent No. 2,627,175 issued February 3, 1953.

It will be appreciated by those skilled in the art that mechanism such as centrifugal extractors present vibration which would tend to wear the bores 42, 44 and 46, as well as pin 48, so that after a long period of use, such pin might have a tendency to become loosened as well as so loose as to drop out, whereupon the manual control shaft 40 would become disconnected from the rock shaft 26 and render it impossible to actuate the clutch. In order to assure that such pin may not become dislocated for any reason such as the wear previously referred to, there is provided a C-shaped clamp member formed of resilient thin strip metal, such clamp being generally indicated as at 50. Such clamp over the main body portion 52 is curved substantially on an open circle, the clamp being open and C-shaped and terminating in outwardly flared ends 54 and 56. The clamp is also provided with oppositely facing dimples or pockets 58 and 60 struck therein if desired prior to tempering, which dimples are of a sufficient depth to receive the rounded projecting ends 62 and 64 of the pin 48. The pin has a length for the purpose substantially greater than the exterior diameter of the sleeve 34.

Figure 2:
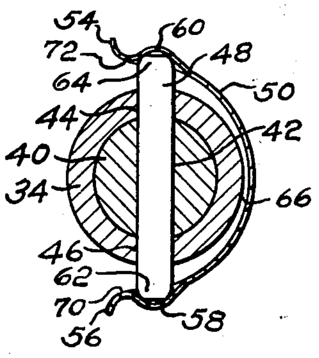
Figure 2 is an enlarged sectional view taken on the line 2—2 of Figure 1.
Figure 3:
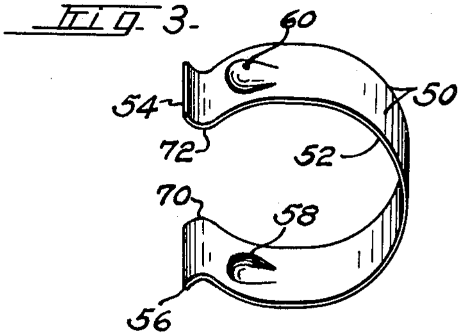
Figure 3 is an enlarged perspective view of the clamp.

In Figure 3, such clip is shown in its relaxed and unstressed shape; and in Figure 2, the clip is shown resiliently spread apart with the dimples embracing the rounded ends 62 and 64 of the pin 48. It will be observed that the clip is of sufficient radius or arcuate length as to be spaced slightly from the sleeve 34 as is indicated at 66, when the clip is positioned over the ends of the pin 48. The flared ends 54 and 56 facilitate the spreading of the clip, so that the rounded ends 70 and 72 may ride over the ends of the pin 48 in placing the clip in position.

It will be seen that a clip of the type described, when once placed in position, will not be required to perform any function so long as the pin 48 remains centered with respect to the shaft and surrounding sleeve. However, in the event such pin should loosen within the sleeve and shaft bores 42, 44 and 46, and tend to move from its central position in either direction, the body portion of the clip will engage and bear upon the exterior of the sleeve member and limit the possible movement of the pin, so that it can never drop out of position and allow the sleeve or the shafts to become disconnected. Should it be desirable as in making repairs to the mechanism to disconnect the shafts from the sleeve, the clip may be readily sprung apart and removed from the ends of the pin, whereupon the pin may be removed. Upon reassembly and the replacing of the pin, the clip may be quickly sprung back into its protective position.

It will be seen that there has thus been provided a relatively simple device which is so easily positioned in place as to eliminate any tendency in assembly-line production or service repair shops of failure to apply such device. It will also be seen that such device will be effective in preventing dislocation of the pin under any and all circumstances.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

In a coupling construction comprising a sleeve, a shaft telescoped part way into said sleeve, said sleeve and said shaft having common aligned diametral bores, a pin for securing said sleeve and shaft against relative rotation extending through said bores, said pin being of a length substantially greater than the external diameter of said sleeve and having rounded ends, and a C-clamp formed of a single piece of resilient flat strip metal, said C-clamp having opposed closed pockets formed therein near the ends thereof for receiving the rounded ends of said pin, and outwardly flared ends beyond said pockets adapted to engage the ends of the pin to facilitate resiliently expanding of the C-clamp for positioning the pockets over and on the ends of a pin, said C-clamp being of a length to extend around said sleeve in spaced relation thereto, and being adapted to contact under diametral pressure the ends of said pin.

References Cited in the file of this patent

UNITED STATES PATENTS

| | | |
|---|---|---|
| 1,176,662 | Dickinson | Mar. 21, 1916 |
| 1,296,042 | Bralove | Mar. 4, 1919 |
| 1,297,995 | Bralove | Mar. 25, 1919 |
| 1,438,549 | Parish | Dec. 12, 1922 |